Nov. 15, 1960   E. RYSER   2,959,833
SLIDING CLASP FASTENERS
Filed Dec. 19, 1955   2 Sheets-Sheet 1

Inventor
Ernst Ryser
By
Dowell & Dowell
Attorneys

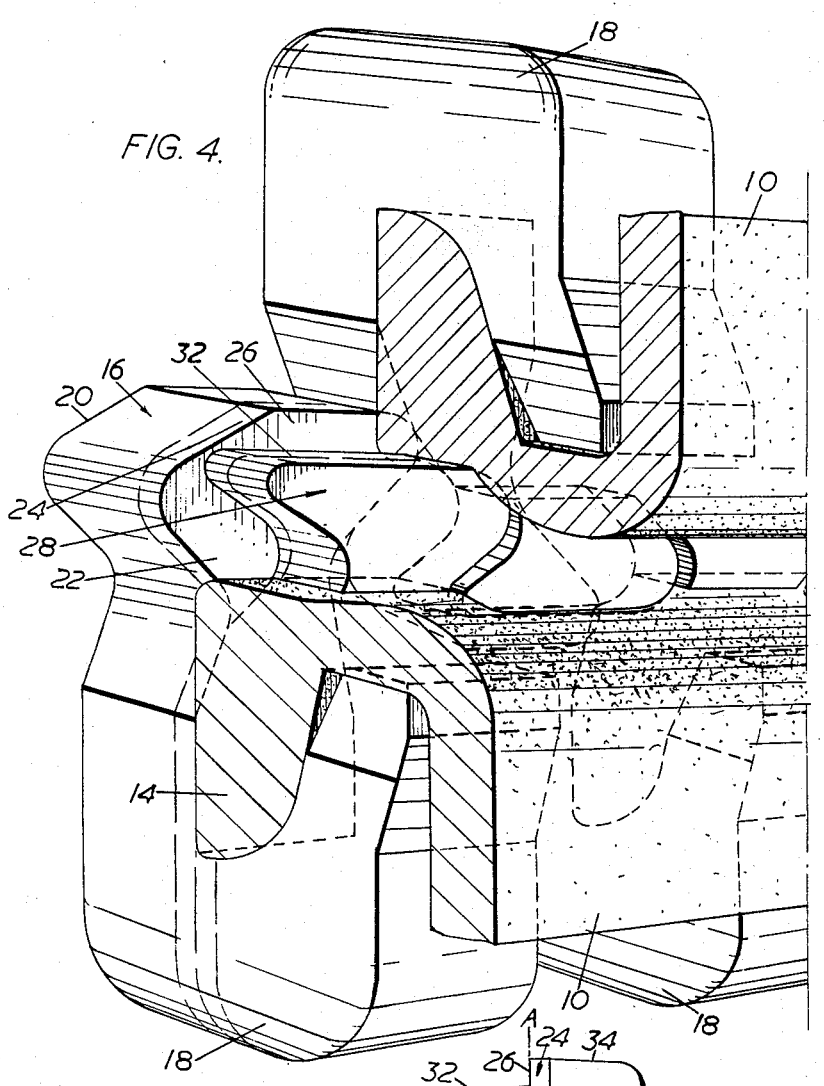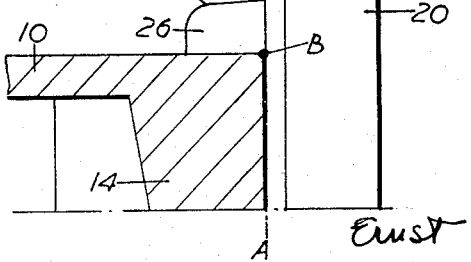

United States Patent Office 2,959,833
Patented Nov. 15, 1960

2,959,833

SLIDING CLASP FASTENERS

Ernst Ryser, Via Turconi, Mendrisio, Tessin, Switzerland, assignor of one-half to Bertrand Voumard, La Chaux-de-Fonds, Switzerland Filed Dec. 19, 1955, Ser. No. 554,026

Claims priority, application Switzerland Dec. 23, 1954

20 Claims. (Cl. 24—205.1)

This invention relates to sliding clasp fasteners of the type having two rows of fastening elements attached to stringer tapes in which the elements having a coupling head which is provided with two oppositely directed abutment faces situated in the longitudinal coupling plane of the fastener. More particularly the invention relates to fasteners of the above type having elements cast directly on to the stringer.

It is an object of the invention to provide a sliding clasp fastener in which the adjacent longitudinal edges of both stringers carrying the fastener elements are so close to each other that the coupling heads of the elements of one row overlap or engage the edge of the stringer of the other row of elements. In this manner not only is the area of abutting surface of each element of one row on the abutment faces of the other row increased but also the gaps which normally exist between successive elements of one row of elements of a conventional sliding clasp fasteners are closed.

According to the invention the edge portion of each stringer extends in the coupling plane of the fastener within the body of the element from the shank of the fastener elements as far as the central longitudinal axis of the fastener or close thereto.

Since the stringer, in the fastener according to the invention, is anchored in the shank and also partly in the head of the element, the shank can be made shorter than can the conventional fastener element shanks, without impairing the necessary strength of anchoring of the stringer.

In the so-called invisible sliding clasp fastener it is necessary that the stringer should emerge from the fastener element as close as possible to the central longitudinal axis of the fastener. With the fastener according to the invention this can be achieved in simple manner by making the stringer extend into the coupling head substantially as far as the central longitudinal axis of the fastener and emerge from the coupling head at this axis.

The accompanying drawings illustrate by way of example an embodiment of the present invention.

Figure 4 is a fragmentary perspective view of a portion of a fastener according to Figure 1; and Figure 5 is a modified form of fastener element seen in elevation.

Figure 1:
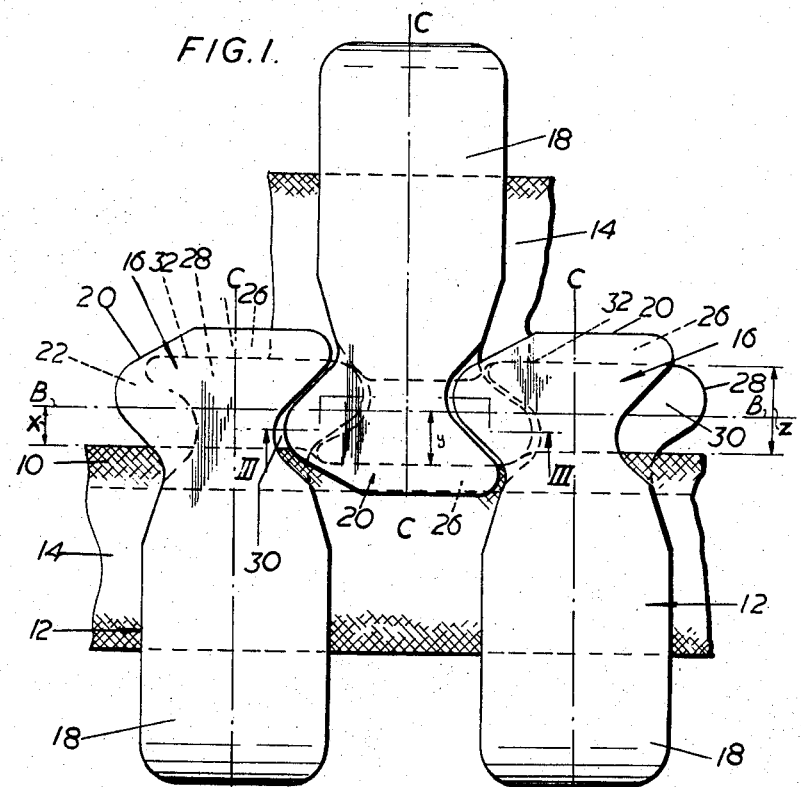
Figure 1 is a plan view of a portion of an invisible fastener.
Figure 2:
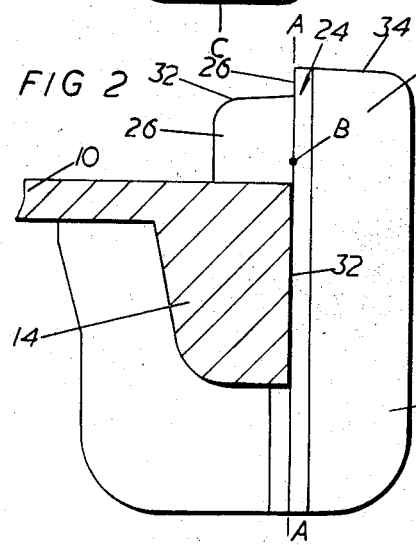
Figure 2 is a transverse section through a fastener stringer showing the fastener element in elevation.
Figure 3:
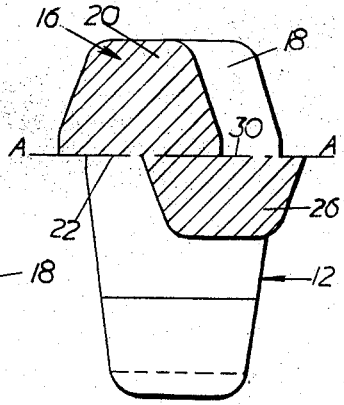
Figure 3 is a longitudinal section through the coupling head along the line III—III of Figure 1.

The sliding clasp fastener shown in Figures 1 to 3 comprises as usual two fastener stringers or tapes 10 each carrying a row of fastener elements 12 die-cast directly on the beaded edge 14 of the stringer. Each fastener element 12 comprises a coupling head 16 and a shank 18. The head 16 is shouldered in the coupling plane AA (Figures 2 and 3). The portion of the head situated at one side of the plane AA forms a coupling projection 20 situated on one side of the longitudinal axis CC of the element (Figure 1) and having an abutment face 22 situated in the coupling plane AA for co-operation with a similar abutment face of the adjacent fastener element of the opposite row of elements. This head portion has a further axially projecting end portion 24 having a further abutment face 26 lying in the coupling plane AA. The head portion situated on the other side of the plane AA is slightly thinner and forms a coupling projection 28 situated on the other side of the longitudinal axis CC of the element and is provided with an abutment face 30 also situated in the plane AA but facing in opposite direction to the abutment face 22.

The elements are so formed on the beaded edge 14 of the stringer 10 that this edge portion, extends in the plane AA of the fastener, from the shank 18 into the coupling head as far as the central longitudinal axis BB (Figure 1) or close thereto. The stringer 10 emerges from the coupling head of the element in the region of the abutment faces 22 and 30.

When the fastener is closed the abutment faces of the elements of one row overlie the abutment faces of the opposite row of elements.

When the fastener is closed the face 26 of each coupling head of one row overlies the edge of the stringer 10 of the other row of elements which is situated in the fastener plane. As shown in Figure 1, the beaded edge 14 of the stringer extends into the coupling head of the fastener element so that the distance x between the edge of one stringer and the central longitudinal axis BB is slightly smaller than the distance y between the end face 32 of the coupling head portion 26 of the other stringer and the said axis.

The end face 32 of the head portion 26, which is at a shorter distance from the axis BB than the end face 34 of the head portion 20, bears against the free edge of the stringer 10 which extends between two adjacent fastener elements of the opposite row.

The gap z between the edges of the opposite stringers emerging from the coupling heads of the elements (Figures 1 and 4) can be made so small (a fraction of one millimetre) that a practically invisible sliding clasp fastener is formed. It is obvious, that the beaded edges of the stringers could extend still further towards the free end of the coupling heads than has been shown in the drawings, so that the edges of the opposite stringers make contact with one another. In this manner a still greater part of the edge portion of each stringer will make contact with the corresponding abutment faces 22 or 30 of the fastener elements. Since also the faces 26 of the axial projections 24 of the elements of one row overlie the edge of the stringer of the other row, each fastener element is supported over the entire width of the coupling head, partly on the corresponding abutment faces of two opposite elements and partly on the edge bead of the stringer portion extending between these two elements. In this manner accidental opening of the fastener when folding or bending about a transverse or longitudinal axis is practically impossible.

By the selection of a suitable material for the tapes a sliding clasp fastener as described can be made practically fluid-tight.

In order to promote easy engagement and disengagement of the elements the projection 20 may be tapered away from the coupling plane AA as is illustrated in Figure 3. The part 26 may also be tapered but this is not essential to the smooth running of the fastener.

It will be understood that the principle of extending the edge of the stringer into the coupling head may also be applied to fasteners other than the type illustrated. It can, for example, be quite easily applied to a conventional fastener having the coupling head described above but in which the stringer emerges from the element at the shank end.

As shown in Figure 5, the edge of the stringer 10 can extend into the coupling head as far as the central longitudinal axis BB. The point where the tape emerges from the element is then also situated on the axis BB. Such a fastener may, if appropriate material is used for the stringers, be made completely fluid-tight.

The elements need not be mounted on stringers in the form of tapes. They can, for example, be mounted directly on to the edge of a garment. The references herein to stringers are to be construed accordingly.

The elements can be made of a metal such as zinc or a zinc base alloy. Alternatively they may be made of plastic such, for example, as nylon, polystyrene, polyamine and so on.

I claim:

1. A sliding clasp fastener comprising two stringer tapes lying in the same plane on either side of a central longitudinal axis, each tape having a row of fastener elements along a beaded edge, which elements each comprise a shank and a coupling head, the heads each provided with two oppositely directed coplanar abutment faces lying in the same plane as the faces of all the other elements and adapted to engage the abutment faces of neighbouring elements on the opposite stringer, the plane of the faces defining a fastener coupling plane; and the beaded edge of the stringer having a section such that one side of that section is substantially flat, the said bead being engaged by each element so that the flat side of the bead lies within the element in the coupling plane and extends in that plane from the shank portion at least as far as the abutment faces on the coupling heads of the elements.

2. A sliding clasp fastener comprising two stringer tapes lying in the same plane on either side of a central longitudinal axis, each tape having a row of fastener elements along a beaded edge, which elements each comprise a shank and a coupling head, the said heads each being provided with two oppositely directed coplanar abutment faces lying in the same plane as the faces of all the other elements and adapted to engage the abutment faces of neighbouring elements on the opposite stringer, the plane of the faces defining a fastener coupling plane; and the beaded edge of the stringer having a section such that one side of that section is substantially flat, the said bead being engaged by each element so that the flat side of the bead lies within the element in the coupling plane and extends in that plane from the shank portion at least as far as the abutment faces on the coupling head of the fastener and the stringer emerges from the coupling head of the fastener elements in the region of the said central longitudinal axis.

3. A sliding clasp fastener comprising two stringer tapes lying in the same plane on either side of a central longitudinal axis, each tape having a row of fastener elements along a beaded edge, which elements each comprise a shank and a coupling head, the said heads each being provided with two oppositely directed coplanar abutment faces lying in the same plane as the faces on all the other elements and adapted to engage the abutment faces of neighbouring elements on the opposite stringer, the plane of the faces defining a fastener coupling plane; the said head also being shouldered in the said coupling plane so as to divide the head into two portions, one on each side of that plane, each head having one of the abutment faces situated in the said coupling plane but facing in opposite direction and on opposite sides of an axis extending longitudinally of the element, one head portion also extending along an axis which extends longitudinally of the element beyond the other head portion so as to provide on that portion a second abutment face lying in the coupling plane; and the beaded edge of the stringer having a section such that one side of that section is substantially flat, the said bead being engaged by each element so that the flat side of the bead lies within the element in the coupling plane and extends in that plane from the shank portion at least as far as the abutment faces on the coupling heads of the fastener.

4. A sliding clasp fastener according to claim 3 in which in the closed position of the fastener the distance between the central longitudinal axis and the beaded edge of the stringer of one row of elements where that edge passes through said elements is smaller than the distance between the central longitudinal axis and the end of that head portion of the elements of the other row of elements which has only one abutment face which faces the bead of the opposite stringer.

5. A sliding clasp fastener according to claim 3 wherein the stringer emerges from the fastener element head at the side thereof opposite to that in which is situated the head portion having two abutment faces.

6. A sliding clasp fastener according to claim 5 in which in the closed position of the fastener the distance between the central longitudinal axis and the beaded edge of the stringer of one row of elements where that edge passes through said elements is smaller than the distance between the central longitudinal axis and the end face of that head portion of the elements of the other row of elements which has only one abutment face which faces the bead of the opposite stringer.

7. A sliding clasp fastener comprising two stringer tapes lying in the same plane on either side of a central longitudinal axis, each tape having a row of fastener elements along a beaded edge, which elements each comprise a shank and a coupling head, the said heads each being provided with two oppositely directed coplanar abutment faces lying in the same plane as the faces on all the other elements and adapted to engage the abutment faces of neighbouring elements on the opposite stringer, the plane of the faces defining a fastener coupling plane; the said head also being shouldered in the said coupling plane so as to divide the head into two portions, one on each side of that plane, each head having one of the abutment faces situated in the said coupling plane but facing in opposite direction and on opposite sides of an axis extending longitudinally of the element, one head portion also extending along an axis which extends longitudinally of the element beyond the other head portion so as to provide on that portion a second abutment face lying in the coupling plane; and the beaded edge of the stringer having a section such that one side of that section is substantially flat, the said bead being engaged by each element so that the flat side of the bead lies within the element in the coupling plane and extends in that plane from the shank portion substantially as far as the central longitudinal axis of the fastener.

8. A sliding clasp fastener according to claim 7 in which in the closed position of the fastener the distance between the central longitudinal axis and the beaded edge the stringer of one row of elements where that edge passes through said elements is smaller than the distance between the central longitudinal axis and the end of that head portion of the elements of the other row of elements which has only one abutment face which faces the bead of the opposite stringer.

9. A sliding clasp fastener according to claim 7 in which the stringer emerges from the fastener element head at the side thereof opposite to that in which is situated the head portion having two abutment faces.

10. A sliding clasp fastener according to claim 9 in which in the closed position of the fastener the distance between the central longitudinal axis and the beaded edge of the stringer of one row of elements where that edge passes through said elements is smaller than the distance between the central longitudinal axis and the end of that head portion of the elements of the other row of elements which has only one abutment face which faces the bead of the opposite stringer.

11. A sliding clasp fastener comprising two stringer tapes lying in the same plane on either side of a central longitudinal axis, each tape having a row of fastener elements along a beaded edge, which elements each comprise a shank and a coupling head, the said heads each being provided with two oppositely directed coplanar abutment faces lying in the same plane as the faces of all the other elements and adapted to engage the abutment faces of neighbouring elements on the opposite stringer, the plane of the faces defining a fastener coupling plane; the said head also being shouldered in the said coupling plane so as to divide the head into two portions, one on each side of that plane, each head having one of the abutment faces situated in the said coupling plane but facing in opposite direction and on opposite sides of an axis extending longitudinally of the element, one head portion also extending along an axis which extends longitudinally of the element beyond the other head portion so as to provide on that portion a second abutment face lying in the coupling plane; and the beaded edge of the stringer having a section such that one side of that section is substantially flat, the said bead being engaged by each element so that the flat side of the bead lies within the element in the coupling plane and extends in that plane from the shank portion at least as far as the abutment faces on the coupling head of the fastener and the stringer emerges from the coupling head of the fastener elements in the region of the said central longitudinal axis.

12. A sliding clasp fastener according to claim 11 in which in the closed position of the fastener the distance between the central longitudinal axis and the beaded edge of the stringer where that edge passes through said elements of one row of elements is smaller than the distance between the central longitudinal axis and the end of that head portion of the elements of the other row of elements which has only one abutment face which faces the bead of the opposite stringer.

13. A sliding clasp fastener according to claim 11 in which the stringer emerges from the fastener element head at the side thereof opposite to that in which is situated in the head portion having two abutment faces.

14. A sliding clasp fastener according to claim 13 in which in the closed position of the fastener the distance between the central longitudinal axis and the beaded edge of the stringer of one row of elements where that edge passes through said elements is smaller than the distance between the central longitudinal axis and the end of that head portion of the elements of the other row of elements which has only one abutment face which faces the bead of the opposite stringer.

15. A sliding clasp fastener according to claim 1 in which the flat side of the bead extends in the coupling plane as far as the central longitudinal axis.

16. A sliding clasp fastener according to claim 15 in which the stringer emerges from the coupling head of the fastener elements in the region of the said central longitudinal axis.

17. A sliding clasp fastener according to claim 11 in which the flat side of the bead extends in the coupling plane as far as the central longitudinal axis of the fastener.

18. A sliding clasp fastener according to claim 12 in which the flat side of the bead extends in the coupling plane as far as the central longitudinal axis of the fastener.

19. A sliding clasp fastener according to claim 13 in which the flat side of the bead extends in the coupling plane as far as the central longitudinal axis of the fastener.

20. A sliding clasp fastener according to claim 14 in which the flat side of the bead extends in the coupling plane as far as the central longitudinal axis of the fastener.

References Cited in the file of this patent

UNITED STATES PATENTS

| | | |
|---|---|---|
| 2,120,924 | Stillschweig | June 14, 1938 |
| 2,355,996 | Morin | Aug. 15, 1944 |
| 2,563,767 | Winterhalter | Aug. 7, 1951 |
| 2,638,651 | Morin | May 19, 1953 |
| 2,720,015 | Morin | Oct. 11, 1955 |

FOREIGN PATENTS

| | | |
|---|---|---|
| 1,053,092 | France | Jan. 29, 1954 |